Patented Nov. 16, 1948

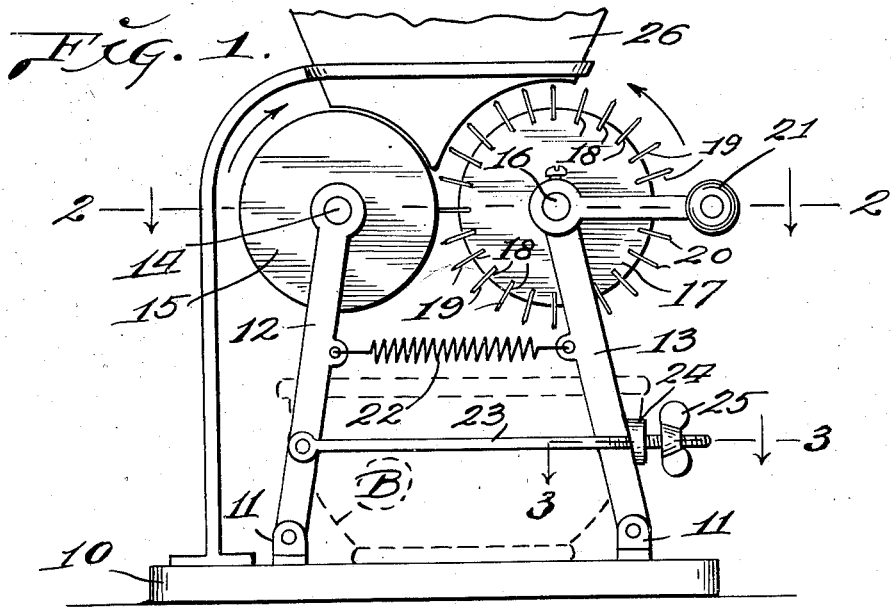
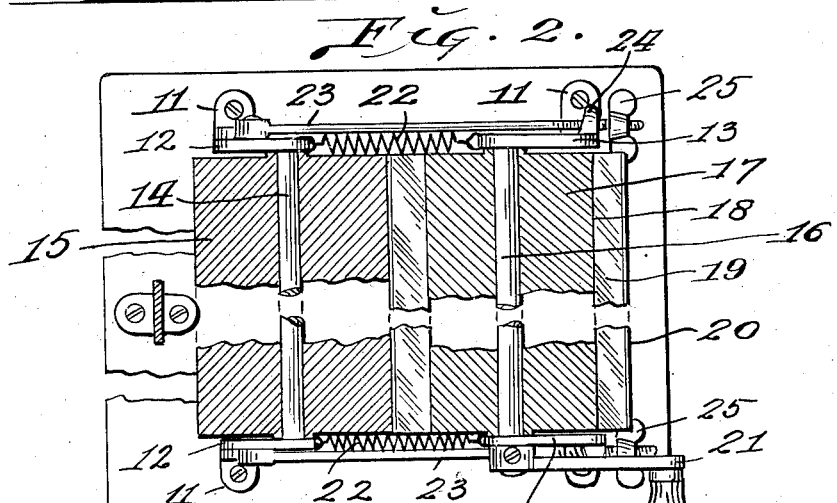
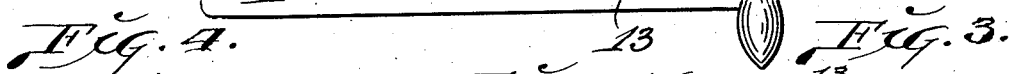
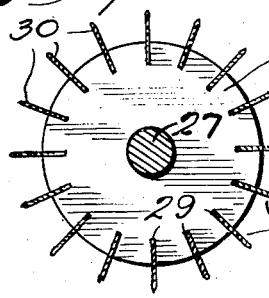
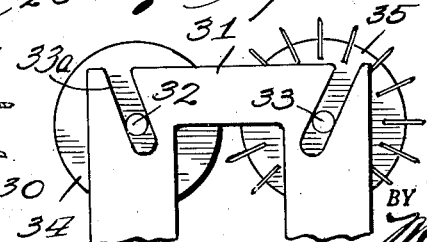
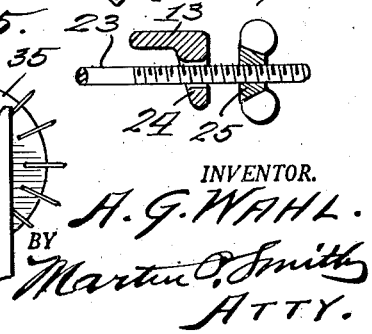

2,454,237

UNITED STATES PATENT OFFICE 2,454,237

VEGETABLE CUTTER

Albert G. Wahl, Los Angeles, Calif.

Application June 20, 1947, Serial No. 755,942

1 Claim. (Cl. 146—122)

My invention relates to a vegetable cutter and shredder of the rotary type, and has for its principal object, to provide simple, practical and highly effective device for rapidly cutting the leaves of vegetables, such as lettuce, cabbage, beets, romaine, celery and the like into shreds or small pieces, as required in the making of salads and other foodstuffs.

A further object of my invention is, to provide a vegetable cutter of the character referred to, having a pair of cooperating rollers, one of which carries a series of blades, and said rollers being mounted for limited movement toward and away from each other and there being adjustable means provided for controlling the limited movement of the rollers away from each other.

With the foregoing and other objects in view, my invention consists in certain novel features of construction and arrangement of parts which will be hereinafter more fully described and claimed and illustrated in the accompanying drawing, in which:

Fig. 1 is a side elevational view of my improved vegetable cutter.

Fig. 2 is a horizontal section taken on the line 2—2 of Fig. 1.

Fig. 3 is an enlarged detail section taken on the line 3—3 of Fig. 1.

Fig. 4 is a cross sectional view of a modified form of the rotary cutter.

Fig. 5 is an elevational view showing a modified arrangement of the mounting for the cooperating rotary members.

Referring by numerals to the accompanying drawings which illustrate a preferred embodiment of the invention, 10 designates a base and pivoted to brackets 11 secured thereon are two pairs of upstanding arms 12 and 13.

Journalled in the upper ends of arms 12 are the ends of a shaft 14, carrying between said arms, a roller 15 preferably of wood.

Journalled in the upper ends of arms 13 are the ends of a shaft 16, carrying between said arms, a roller 17 of wood, plastics or light weight metal such as aluminum.

Formed in the periphery of roller 17 are spaced longitudinally disposed radial slots 18, in which are seated the inner edge portions of thin sheet metal blades 19, having sharp outer edges 20.

A crank handle 21 is located on one end of shaft 16.

The pairs of arms 12 and 13 are yieldingly held against swinging movement away from each other by retractile springs 22, which connect said arms below rollers 15 and 17.

To limit the swinging movement of the rollers 15 and 17 away from each other, rods 23 are pivotally connected to arms 12 below springs 22, which rods pass freely through perforated brackets 24 on arms 13 and the threaded ends of said rods beyond said brackets, receive winged nuts 25.

A hopper 26 for the vegetables to be cut, is suitably supported above rollers 15 and 17 as seen in Fig. 1 and a bowl such as B for receiving the cut vegetables is positioned on base 10 below said rollers.

In use, roller 17 carrying blades 19 is rotated by means of crank handle 21 and vegetables from hopper 26 discharge downwardly between the two rollers, to be cut and shredded by said blades, and such cuttings drop in bowl B.

To cut vegetables into fine shreds or pieces, they may be caused to pass into two or more times between the rollers.

Normally the springs 22 maintain the edges of blades 19 against the periphery of roller 15, which latter provides a cutting surface for said blades and to limit and regulate the distance of movement of the rollers away from each other, nuts 25 are actuated on the threaded ends of rods 23 toward or away from the stops formed by brackets 24.

A modified form of the cutting roller, shown in Fig. 4, comprises a shaft 27, carrying adjacent its ends, discs such as 28, provided in their peripheral portions with spaced radial slots 29, in which are seated the ends of blades 30.

In the modified form of roller mounting shown in Fig. 5, the upper portion of side frames such as 31, are provided with slots 33a, which converge downwardly and receive the ends of shafts 32 and 33.

Shaft 32 carries a plain surfaced roller 34, and mounted on shaft 33 is a blade carrying roller 35.

Thus it will be seen that I have provided a vegetable cutter and shredder which is simple in structure, inexpensive of manufacture, and very effective in performing the functions for which it is intended.

Minor changes in the size, form and construction of the various parts of my improved vegetable cutter may be made and substituted for those herein shown and described without departing from the spirit of the invention, the scope of which is set forth in the appended claim.

I claim as my invention:

In a vegetable cutter, a base, two pairs of upright arms having their lower ends pivoted on said base, rollers mounted for rotation upon and between the upper portions of the members of said pairs of arms, spaced radially arranged blades projecting from the periphery of one of said rollers, retractile springs connecting the intermediate portions of the arms on both sides of the cutter, perforated lugs on the lower portions of the arms carrying the roller provided with the blades, rods passing through said perforated lugs, said arms at one end being pivoted to the lower portions of the arms carrying the other roller, the ends of said rods being threaded and nuts mounted on the threaded portions of said rods outwardly from said lugs.

ALBERT G. WAHL.

REFERENCES CITED

The following references are of record in the file of this patent:

UNITED STATES PATENTS

| Number | Name | Date |
| --- | --- | --- |
| No number | Greene | Aug. 8, 1833 |
| 4,371 | Blackman | Feb. 10, 1846 |
| 61,932 | Gale | Feb. 12, 1867 |
| 727,177 | Montgomery | May 5, 1903 |